(12) United States Patent
Montemartini et al.

(10) Patent No.: US 7,267,222 B2
(45) Date of Patent: Sep. 11, 2007

(54) LOW COST FLIGHT ATTACHMENT FOR MODULAR BELTS

(75) Inventors: Paolo Montemartini, Gallarate (IT); Roberto Madonini, Caponago (IT); Enrico Visconti, Caponago (IT); Verbena Flavio, Vittorio Veneto (IT)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/200,451

(22) Filed: Aug. 9, 2005

(65) Prior Publication Data
US 2007/0034486 A1    Feb. 15, 2007

(51) Int. Cl.
*B65G 17/06* (2006.01)
(52) U.S. Cl. ........................ 198/853; 198/850
(58) Field of Classification Search ................ 198/850, 198/851, 852, 853, 778
See application file for complete search history.

(56) References Cited

U.S. PATENT DOCUMENTS

| | | |
|---|---|---|
| 1,560,716 A | 11/1925 | Newdick |
| 3,061,077 A | 10/1962 | Noffsinger |
| 4,317,514 A | 3/1982 | Noren et al. |
| 4,832,183 A | 5/1989 | Lapeyre |
| 5,358,095 A | 10/1994 | Curl |
| 5,413,211 A | 5/1995 | Faulkner |
| 5,490,591 A | 2/1996 | Faulkner |
| 5,497,874 A | 3/1996 | Layne |
| 6,332,531 B1 | 12/2001 | Damkjaer |
| 6,467,610 B1 | 10/2002 | MacLachlan |
| 6,554,129 B2 | 4/2003 | Straight et al. |
| 6,695,135 B1 * | 2/2004 | Lapeyre ...................... 198/853 |
| 2003/0136647 A1 | 7/2003 | Knott et al. |
| 2006/0185967 A1 * | 8/2006 | Sedlacek et al. ............ 198/853 |

FOREIGN PATENT DOCUMENTS

EP    0 642 997 A    3/1995

* cited by examiner

*Primary Examiner*—James R. Bidwell
(74) *Attorney, Agent, or Firm*—Hodgson Russ LLP

(57) ABSTRACT

A bracket for use in a modular belt conveyor, the bracket comprises a modular portion having a first bracket opening, a support portion having a second bracket opening, and an offset portion that joins the modular portion and support portion such that the support portion is offset from the modular portion. A pair of spaced apart brackets is installed in a row of modules, and a load member is positioned in the holder openings to make a low cost flight for a modular belt conveyor. A modular link-pair having first and second link ends extending in opposite directions from an intermediate section. The second link end has a holder that has a holder opening, and a pair of modular link-pairs is installed in a row of modules. A load member is positioned in the spaced apart holder openings to thus make a low cost flight.

26 Claims, 5 Drawing Sheets

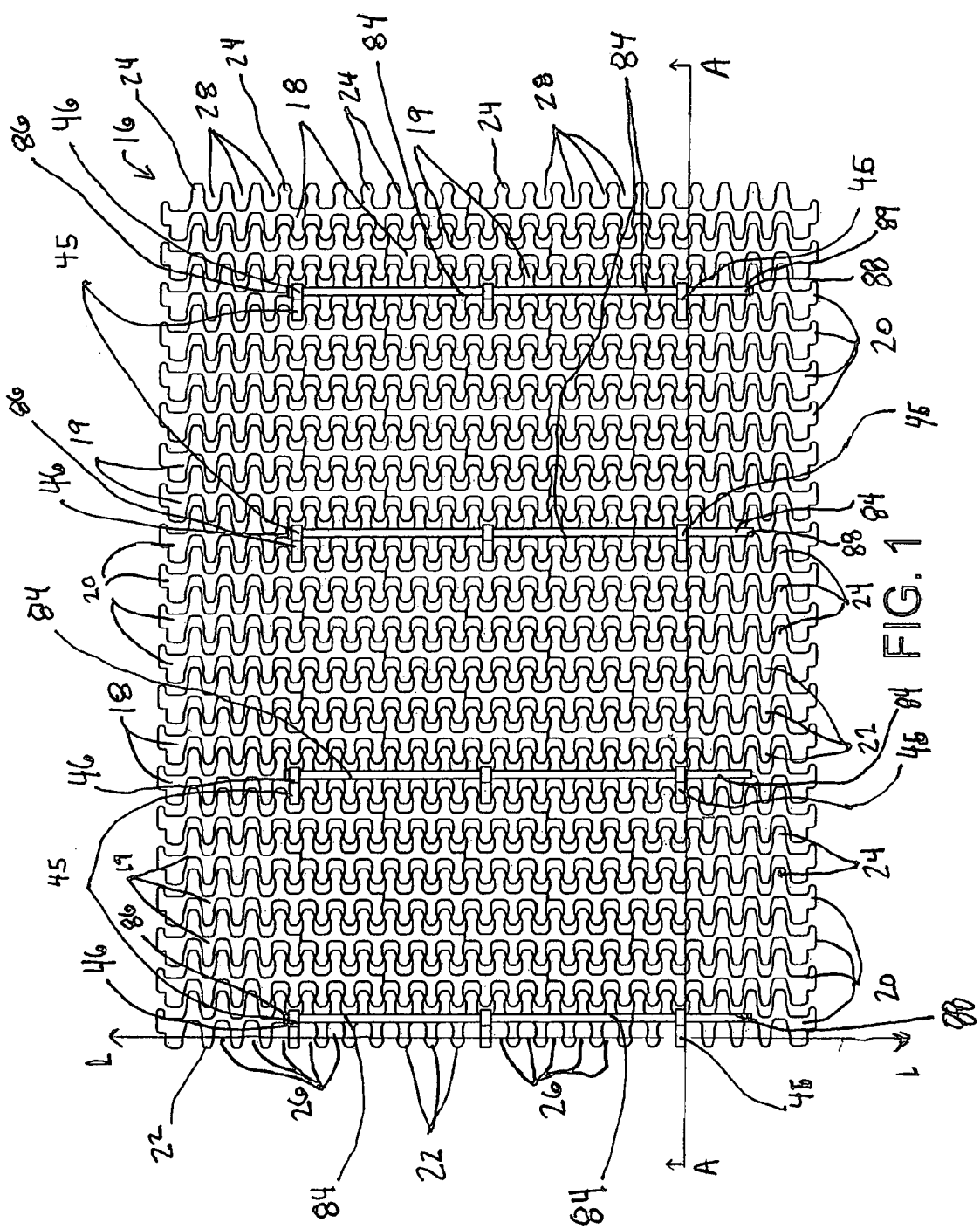

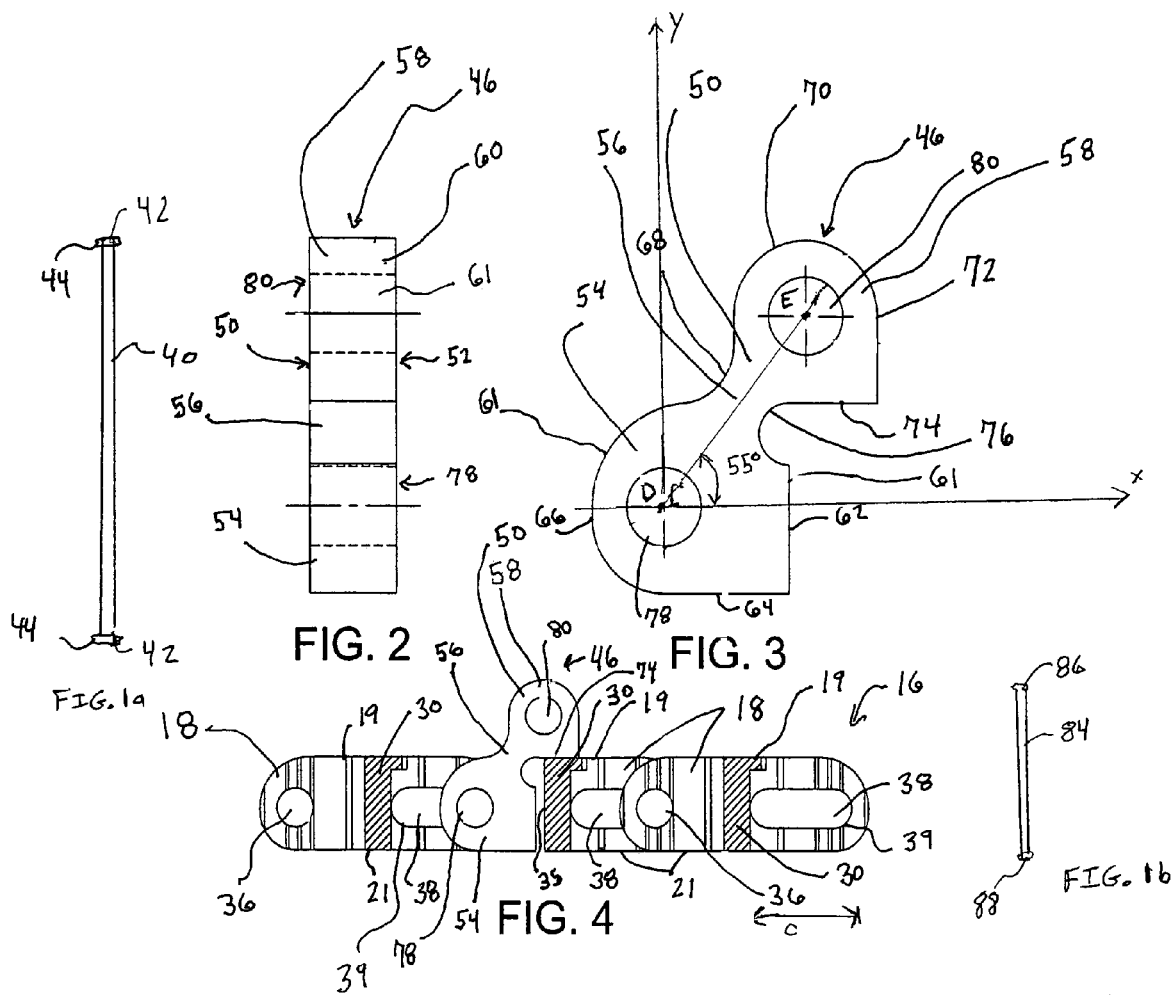

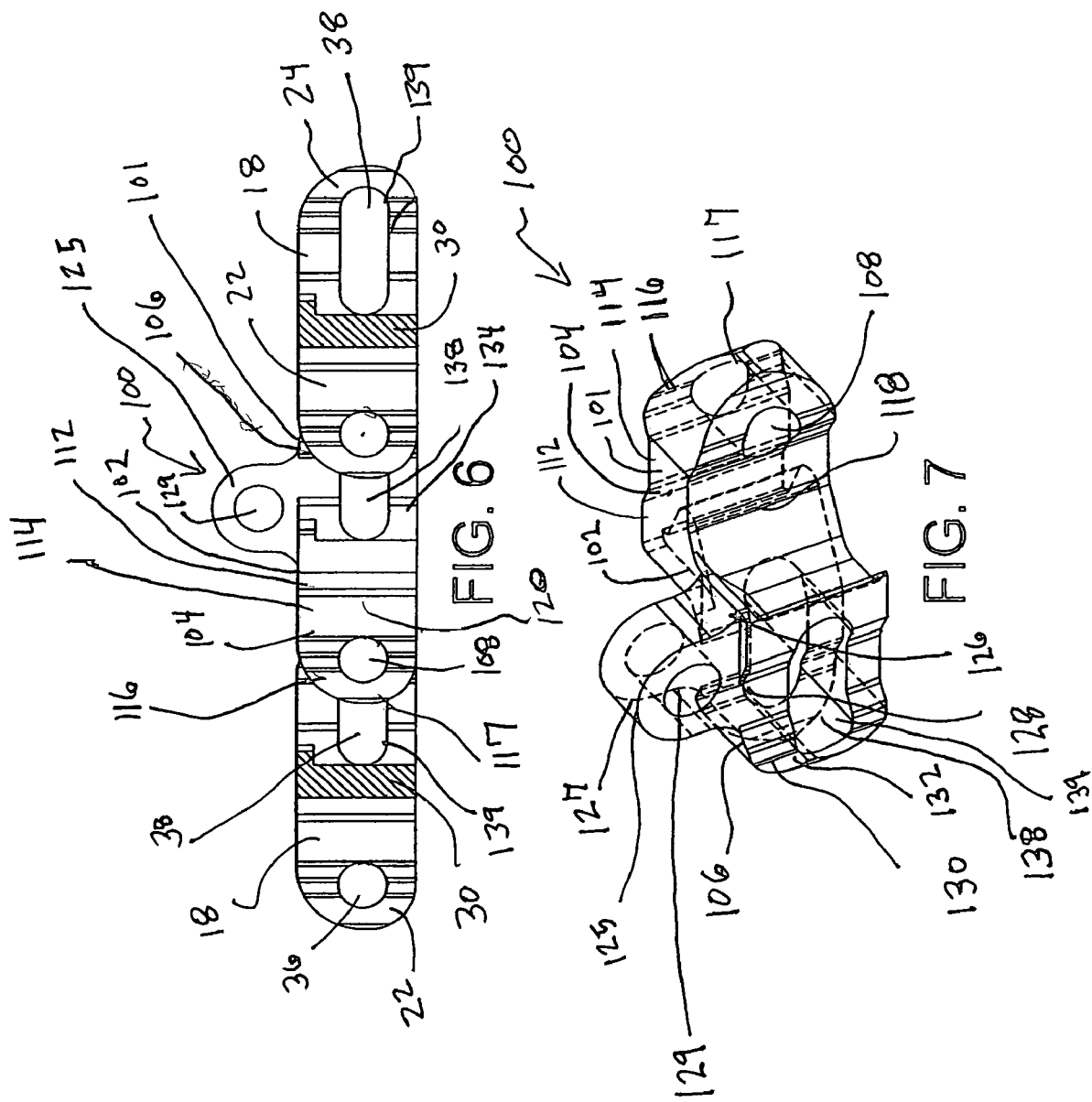

LOW COST FLIGHT ATTACHMENT FOR MODULAR BELTS

FIELD OF THE INVENTION

The present invention relates to conveyor belts and more particularly, to modular plastic conveyor belts formed of rows of plastic belt modules pivotally interlinked by transverse pivot rods.

BACKGROUND OF THE INVENTION

Modular belt conveyors are used to transport goods, products, and raw materials. Modular belt conveyors are made up of a number of modules that are joined together. These modular belt conveyors can be arranged such that they are horizontal or inclined.

A common problem with inclined modular belt conveyors is that the goods, products, or raw materials on the conveyor may slip down the inclined modular belt due to gravity forces. Examples of past attempts to overcome this problem include the use of flights. These flights are built into the modular belt conveyors in a number of ways. U.S. Pat. No. 4,832,183 to Lapeyre, U.S. Pat. No. 5,413,211 to Faulkner, U.S. Pat. No. 5,490,591 to Faulkner, and U.S. Pat. No. 6,332,531 to Damkjaer show examples of such flights. All of these references disclose modifying the belt modules by integrally molding vertical upstanding plates extensions in the modules, or attaching the extensions to the top surface of the modules. The flights are joined to the belt at spaced apart distances, such that goods being transported can be placed on the belt between the flights to keep the goods separated. Also, U.S. Pat. No. 6,467,610 to MacLachlan shows a possible arrangement wherein the flights and similar attachments are not integrated with the body of the module, but are fixed with rods or screws to a module with molded on attachment means.

One of the problems associated with the above configurations is that they involve significant costs and manufacturing complexity. In addition, none of the above configurations provide for flexibility because a specific module produced as set forth above does not allow the module to be used in other modular conveyor belts. Thus, a disadvantage of the above is that a different module and flight are required for each belt. Usually the flights of the prior art modules provide closed plates suitable for transporting small items and bulk material. In many cases larger objects such as packed articles and boxes are conveyed that do not require a closed flight plate.

Thus, there is a need for a cost effective flight that is inexpensive, easy to use, and that can be readily installed on any of a number of differently styled and configured modular belt conveyors.

SUMMARY OF THE INVENTION

The present invention meets the above-described need by providing a low cost flight for a modular belt conveyor. The present invention also allows for fluid and air to flow freely along the belt and is not significantly hindered by the flight from flowing.

In one of the embodiments, a bracket is provided that comprises a modular portion having a first bracket opening, a support portion having a second bracket opening, and an offset portion that joins the modular portion and support portion such that the support portion is offset from the modular portion. The bracket is, in one of the embodiments, made of plastic. The bracket supports an elongate rod which serves as the flight to hold the goods in position as the belt travels along sloped paths.

Each module has alternating first link ends having transverse pivot rod openings and second link ends having elongated transverse openings, which extend from an intermediate section in opposite directions and are offset from one another. One of the first link ends in a module or row of modules is cut, or the module is formed with a truncated first link end, which creates space for a bracket in the module. The brackets can be positioned in the bracket spaces. A pivot rod is inserted through the pivot rod openings in the first link ends and the first bracket openings to thus pivotally attach the brackets to the modules. This attachment results in the second bracket openings in the support portions of the brackets being aligned for insertion of a load member.

A load member, which can be embodied to have the same or similar dimensions as the pivot rod, is moved through the second bracket openings. The load member can then have a head formed at its ends so that it does not work its way out of the second bracket openings. The load member and brackets thus provide for a low cost flight for the modular belt conveyor. The flights can be installed in the modular belt conveyor at any desired spaced interval from one another.

In another embodiment a modular link-pair is provided. The modular link-pair is integrally formed and comprises a first link and a second link joined to one another by a reach bar, and each extends from the reach bar in opposite directions. The first link and second link are offset from one another by the intermediate section. The first link has a transverse pivot rod opening and the second link has a transverse elongated opening. In addition, the second link end has a holder having an opening for receiving a load member therein.

A pair of spaced apart modular link-pairs is provided for in a row of modules such that the transverse pivot rod openings and transverse elongated openings in the modular link-pairs align with the transverse pivot rod openings and transverse elongated openings in the first and second link ends of the modules. As a result of this arrangement, the load member openings are aligned. Then pivot rods are inserted in the pivot rod openings and the load member is inserted in the load member openings. A flight is thus formed by the spaced apart modular link-pairs and load member. The modular conveyor belt can be provided with a number of spaced apart flights.

In another embodiment, the modular link-pair can be embodied such that the holder is integrally formed in the first link of the modular link-pair.

Thus, the flight provided for herein is low cost, lightweight, can be mass produced and is relatively easy to install in the modular belt conveyor. In addition, the flight stabilizes the product being transported on the modular belt conveyor as it is moved up and/or down an incline.

BRIEF DESCRIPTION OF THE DRAWINGS

At the outset, it should be noted that like reference numbers are intended to identify the same structure, portions, or surfaces consistently throughout the figures.

FIG. 1 is a top plan view of a modular belt conveyor that has a flight made from brackets.

FIG. 1a is a plan view of a pivot rod.

FIG. 1b is a plan view of a load member.

FIG. 2 is a front elevational view of the bracket.

FIG. 3 is a right side elevation view of the bracket.

FIG. 4 is a sectional view of a portion of the modular belt conveyor taken along cut line A-A of FIG. 1.

FIG. 6 is a sectional view of a portion of the modular belt conveyor having a modular link-pair take along cut line B-B of FIG. 5.

FIG. 7 is a rear perspective view of the modular link-pair.

DETAILED DESCRIPTION

Figure 5:
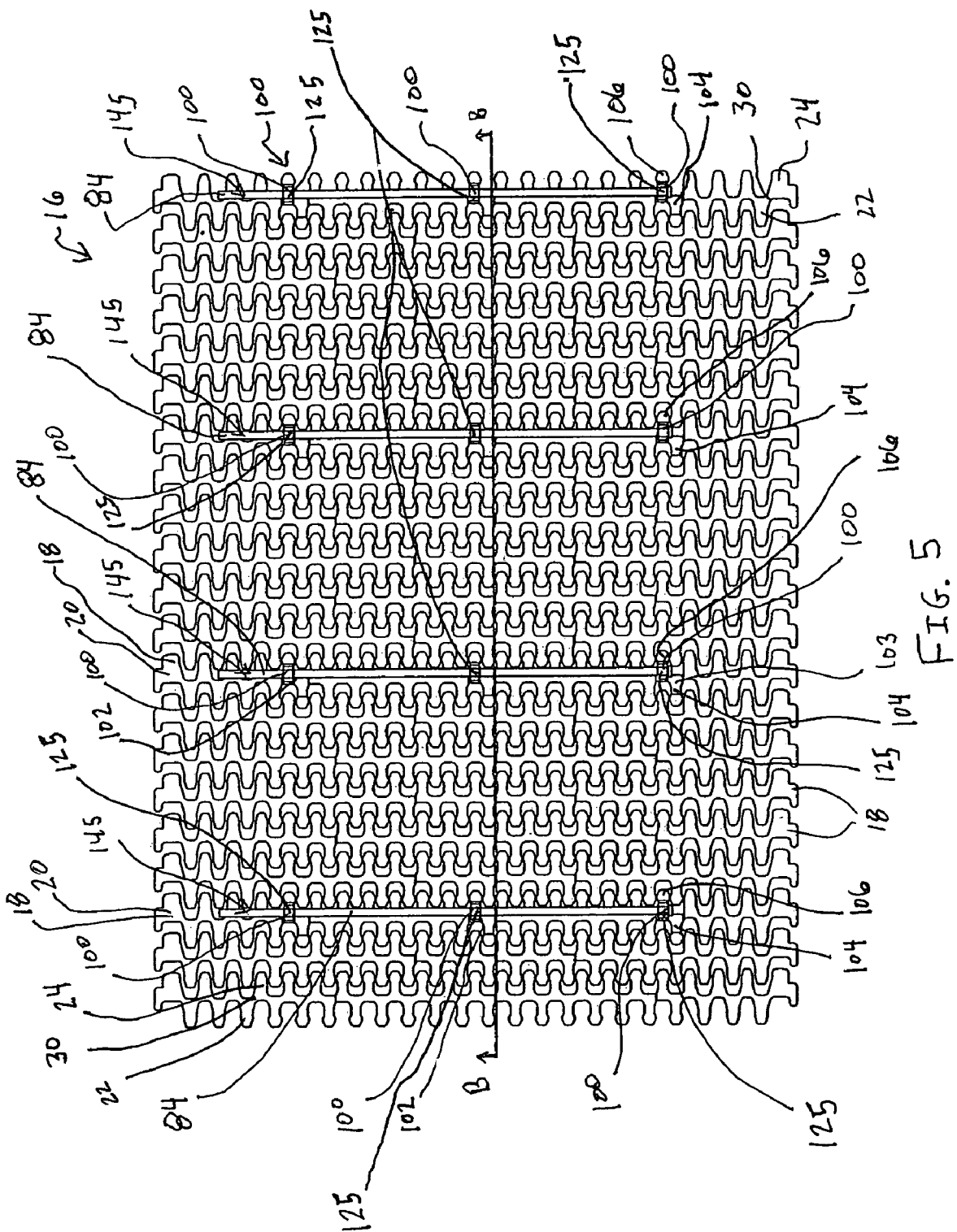
FIG. 5 is a top plan view of a modular belt conveyor having a modular link-pair.

Referring generally to FIGS. 1-4, flight 45 comprises spaced apart brackets 46 that are attached to a module 18, or row of modules 20, of a modular belt conveyor 16. The brackets 46 support a load member 84 above the row of modules 18 and the load member 84 prevents product being transported on the modular belt conveyor 16 from sliding down an incline due to gravity forces.

In particular, FIG. 1 is a top plan view of the modular belt conveyor 16 to which the brackets 46 are attached. The modular belt conveyor 16 comprises modules 18 that are arranged such that they form rows of modules 20. Each module 18 has a load surface 19 upon which the products/goods (not shown) being transported are placed, and an opposed surface 21. The load and opposed surfaces, 19, 21, respectively, are substantially planar. Each module 18 further comprises first link ends 22 that extend in one direction from an intermediate section 30, and second link ends 24 that extend in the opposite direction from the intermediate section 30. In addition to extending from the intermediate section 30 in opposite directions, the first and second link ends 22, 24, respectively, are also offset from one another, as shown in FIG. 1 and 4. The first link ends 22 have openings 36 and the second link ends 24 have elongated openings 38 defined by a surrounding surface 39, as shown in FIG. 4. In one of the embodiments, the reach bars 30 and the first and second link ends, 22, 24, respectively, are integrally formed from, for example, a plastic.

As shown in FIG. 1, the modules 18 are arranged in rows 20 in the modular belt conveyor 16, such that first spaces 26 are defined between adjacent first link ends 22, and second spaces 28 are defined between adjacent second link ends 24. To form the modular belt conveyor 16, adjacent rows of modules 20 are moved together. This results in the first link ends 22 of one row of modules 20 being positioned in the second spaces 28 defined between adjacent second link ends 24 in an adjacent row 20 of modules. It also results in the second link ends 24 of one row of modules 20 being positioned in the first spaces 26 defined between the first link ends 22 of an adjacent row of modules 20, as shown in FIG. 1.

In the above arrangement, the first link openings 36 in the row of modules 20 are aligned along a pivot rod axis, designated L in FIG. 1. Adjacent rows of modules 20 are attached to one another by moving the first link ends 22 of one of rows of modules 20 into the second spaces 28 defined between the second link ends 24 of an adjacent row of modules 20, such that at the same time the second link ends 24 on the adjacent row of modules 20 are moved into the first spaces 26 defined between the first link ends 22. In this arrangement, the openings 36 in the first link ends 22 in one row of modules 20 are aligned with the elongated openings 38 in the second link ends 24 of the adjacent row of modules 20. A pivot rod 40, shown in FIG. 1a, is inserted through the openings 36 and the elongated openings 38, and the ends 42 of the pivot rod 40 are formed to have heads 44 so that the pivot rod 40 cannot slide out of or work its way out of the openings 36 and elongated openings 38. The pivot rod 40 can be in close fitting type relationship with the openings 36 such that there is little play between the pivot rod 40 and the openings 36 defined in the first link ends 22.

The situation is different with respect to the pivot rod 40 and the elongated openings 38 defined in the second link ends 24. The pivot rod 40 passes through the elongated openings 38 and there is play between the pivot rod 40 and second link ends 24 due to the elongated openings 38. This is because the elongated openings 38 extend along a substantial portion of the length, designed C in FIG. 4, of the second link ends 24. As a result, adjacent rows of modules 20 can be moved toward or away from one another. For example, adjacent rows of modules 20 can be compressed together such that the spaces 26 between the first link ends 22 in one row of modules 20 are occupied by the second link ends 24 of an adjacent row of modules 20. Then, when a tension force is applied the adjacent rows of modules 20 move away from one another, until the surrounding surfaces 39 that define the elongated openings 38 contact the pivot rod 40. The elongated openings 38 thus allow the second link ends 24 to be slid back and forth relative to the pivot rod 40. An endless modular belt (not shown) can be formed from modules 18 linked together with pivot rods 40. The elongated transverse openings allow the belt to "fan out" or collapse on each side such that the belt can negotiate turns in either direction. The flight attachment of the present invention can also be used with straight running belts or other modular belts as will be evident to those of ordinary skill in the art based on this disclosure. In most cases straight running belts will not have elongated openings 38, but will have round holes of the size of opening 36 in both link ends.

As shown in FIG. 1, the above-described modular belt conveyor 16 is provided with flights 45 that are low cost, light weight, and easy to install. Each flight 45 is pivotally attached to the modules 18 so that the flight 45 becomes part of the modular belt conveyor 16. As shown in FIG. 1, the flight 45 comprises a pair of brackets 46 and a load member 84 that is supported by the brackets 46. The brackets 46 are attached to the modules 18 with the pivot rod 40, when the modular belt conveyor 16 is being assembled from the modules 18 and the pivot rods 40 as described above.

FIGS. 2-4 show one of the embodiments of the bracket 46. As shown, the bracket 46 comprises a module portion 54, an offset portion 56, and a support portion 58. The bracket 46 also has opposed first and second sides 50, 52, respectively. The module portion 54, offset portion 56, and support portion 58 may be integrally formed from, for example, plastic, metal, and/or combinations thereof. A surrounding surface 60 extends between the first and second surfaces 50, 52, respectively, and around the periphery 61 of the bracket 46, as shown in FIG. 2.

As shown in FIG. 3, the surrounding surface 60 has a first planar surface portion 62 that meets with a second planar surface portion 64 at about a 90° angle. The second planar surface portion 64 extends to a first convex surface portion 66 that extends to first concave surface portion 68, and the concave surface portion 68 has a radius. The first concave surface portion 68 extends to a second convex surface portion 70 that extends to a third planar surface portion 72. The third planar surface portion 72 meets with a fourth planar surface portion 74 at about a 90° angle. The fourth planar surface portion 74 extends to a second concave surface portion 76 and which extends to the first planar surface portion 62.

In addition, the module portion 54 defines a first bracket opening 78 having a centerpoint designated D, and the offset portion 56 defines a second bracket opening 80 having a centerpoint designated E. In the embodiment shown, the centerpoint E of second bracket opening 80 is offset from the centerpoint D of the first bracket opening 78 in the X-axis direction and in the Y-axis direction, as shown in FIG. 3, because of the offset portion 56. In one of the embodiments centerpoint E is at about a 50°-55° angle to centerpoint D, as shown in FIG. 3. Therefore, when the bracket 46 is installed in the module 18, as shown in FIG. 4, the offset portion 56 is positioned above the module 18, and it extends along the load surface 19 of the module 18 and over the intermediate section 30. As an alternative, the centerpoint E could be positioned such that it is only offset in the Y-axis direction. It is to be understood that the offset portion 56 connects the module portion 54 and the support portion 58 and the offset portion 56 may extend in one or both of the X and Y-axis directions shown in FIG. 3. The fourth planar surface 74 of the offset portion 56 abuts against and is supported by the intermediate section 30, as shown. In addition, the first planar surface 62 of the bracket 46 abuts against the intermediate section 30, and the first and fourth planar surfaces 62, 74, respectively, of the bracket 46 prevent the bracket 46 from rotating after it has been pivotally attached to the module 18.

The flight 45 is made from brackets 46 and the load member 84, as shown in FIGS. 1-1b. In one of the embodiments the load member 84 is a pivot rod having the same diameter and length as the above-described pivot rod 40, which decreases costs. In other embodiments, the load member 84 can have a length less than the length of the pivot rod 40.

To assemble the flight 45, the brackets 46 are attached to the module 18 or row of modules 20 in the above-described manner. The brackets 46 can be installed in the same module 18, or each bracket 46 can be installed in different modules 18 in the same row of modules 20. In order to accommodate the brackets 46, the module 18 is modified such that one of the first link ends 22 is cut away. Or, the module 18 can be formed such that one of the first link ends 22 is truncated to allow space for a bracket 46. Either method results in a bracket space 53 being formed where the first link end 22 is absent. As shown in FIG. 4, one of the brackets 46 is positioned in the bracket space 53 such that the first bracket opening 78 aligns with the openings 36 in the first link ends 22 in the modules 18 and with the elongated openings 38 in the second link ends 24 of the adjacent row of modules 20. In this configuration, the fourth planar surface 74 of the bracket 36 abuts the top surface of the truncated link end and/or the top surface of intermediate section 30. Then, the pivot rod 40 is moved through the openings 36 in the first link ends 22 in the row of modules 20, and through the elongated openings 38 in the second link ends 24 of the adjacent row of modules 20, and through the first bracket opening 80. In this manner the bracket 46 is pivotally attached to the module 18 by the pivot rod 40. Another bracket 46 is attached to the module 18, or row of modules 20, such that the second bracket openings 80 are aligned with one another, as shown in FIG. 1.

The movement of the bracket 46 is limited when attached to the module 18 by the pivot rod 40. In particular, the fourth planar surface 74 of the bracket 46 abuts against the load surface 19 of the link end and/or intermediate section 30, as shown in FIG. 4. This prevents the bracket 46 from being rotated in the clockwise direction as viewed in FIG. 4. In addition, the bracket 36 cannot be rotated any signification amount in the counterclockwise direction, as viewed in FIG. 4, because the first planar surface 62 of the bracket 46 will contact the first link surface 35 of the intermediate section 30.

As shown in FIG. 1b, the load member 84 has first and second ends 86, 88, respectively. One of the first and second ends 86, 88 of the load member 84 is provided with a head 89. The end without the head 89 is moved through the aligned second openings 80. Then the end without the head then has a head formed on it so that the load member 84 cannot be moved out of the second openings 80. Forming a head on a pivot rod, such as the load member 84, is well known to those having ordinary skill in the art. The load member 84 is thus attached to the brackets 46 in this manner in a position above the load side 19 of the modules 18. The load member 84 can comprise plastics, metals, and combinations thereof. In one of the embodiment, embodiment the load member 84 can be positioned between about 0.25 to about 1.0 inches (about 6.0 millimeters to about 25 millimeters) above the load side 19 of the row of modules 20, but in other embodiments the distance can be greater or less. For example, the load member 84 can be supported such that it is substantially flush with the load surface 19 of the modular belt conveyor 16. The flight 45 requires a minimal amount of material, is easy to install and remove, is lightweight, and can be made at low production cost.

In use, the product being transported on the modular belt conveyor 16 abuts against the flight 45. When the modular conveyor belt 16 travels up an incline, the flight 45 prevents the product being transported from moving down the incline due to gravity forces. Also, when the modular belt conveyor travels down an incline, the flight 45 can be used to prevent the product being transported on the modular belt conveyor from uncontrollable moving down the modular belt conveyor 16 due to gravity forces.

FIG. 1 shows the use of three brackets 46 installed in each row of modules 20. In other embodiments, only two brackets 46 are employed to support the load member 84 above a row of modules 20. In other embodiments, more than three brackets 46 can be installed or attached to the row of modules 20 in the above described manner.

The flight attachment of the present invention is particularly well suited for spiral conveyor applications. Spiral belts are typically very long (200-1,000 m) and have a very low inclination. If flights are required, they typically do not need to carry a lot of load, therefore a light, low-profile design is desirable in most cases. Also, a low weight is desirable because on the very long belts a large number of flights may be required and the weight added to the belt should be kept as low as possible, in order to keep the additional load on the belt low and to save driving energy. Further, the operating principle of spiral conveyors requires the belt to be pressed against the rotating drum or cage to be moved forward by friction. This process causes the belt to be slightly distorted and changes the alignment of the collapsed module rows while moving through the spiral. The flight attachment of the present invention is flexible and thus does not hinder the belt from freely moving and adapting to the conditions in the spiral conveyor.

Another embodiment is shown in FIGS. 5-10. In this embodiment instead of the above-described bracket 46 there is a complete modular link-pair 100 that attaches to the module 18 with pivot rods 40 to become part of a modular belt conveyor 16, as shown in FIG. 5. The flight 145 of this embodiment comprises spaced apart modular link-pairs 100 that attach to a row of modules 20 and a load member 84 supported by the spaced apart modular link-pairs 100.

This embodiment has a modular belt conveyor 16 that comprises modules 18 that are arranged in rows of modules 20, as shown in FIG. 5. The modules 18 have first link ends 22 that have openings 36 and second link ends 24 that have elongated openings 39 that are joined together by reach bars 30, as described above in connection with the first embodiment. The modular link-pair 100 can be attached to the modules 18 in a row of modules 20 to become part of the modular belt conveyor 16. In addition, this embodiment does not require modification of existing modules.

Figure 9:
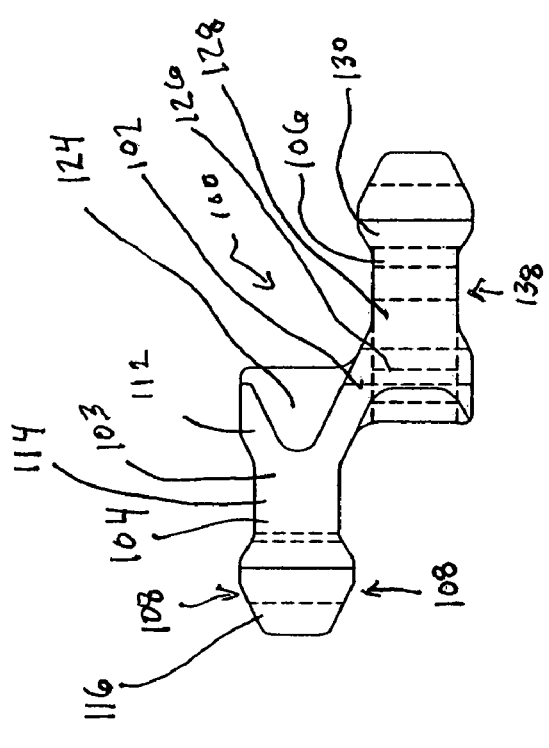
FIG. 9 is a bottom plan view of the modular link-pair.

The modular link-pair 100 comprises a body 105 having a load surface 101 and an opposed support surface 103, as shown in FIGS. 7 and 9. Goods being transported are placed on the load surface 101. The modular link-pair 100 has a intermediate section 102 and first and second link ends 104, 106, respectively, extend from the intermediate section 102 in opposite directions and are offset from one another, as shown in FIGS. 5 and 7.

As shown in FIGS. 6 and 7, the first link 104 has a first portion 112 that is joined to the intermediate section 102, and the first portion 112 is joined to an intermediate portion 114. The intermediate portion 114 is joined to an enlarged portion 116 located at an end 117 of the first link 104. The enlarged portion 116 has a pivot rod opening 108. The first link 104 further comprises opposed first and second surfaces 118, 120, respectively, that extend between the load surface 101 and support surface 103. A curved surface 122 at the end 117 of the first link 104 extends between the load surface 101 and support surface 103, and between the first and second surfaces 118, 120, respectively, as shown in FIG. 7. As shown in FIG. 9, the first link 104 further defines a first link recess 124 that extends from the support surface 103 of the modular link-pair 100 into the first portion 112 of the first link 104. The recess saves on both material and decreases the weight of the modular link-pair 100.

Figure 8:
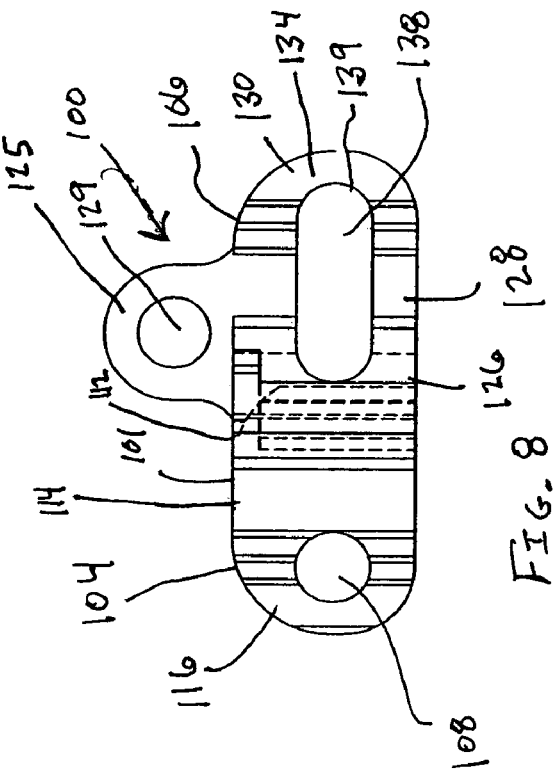
FIG. 8 is a left side elevational view of the modular link-pair.
Figure 10:
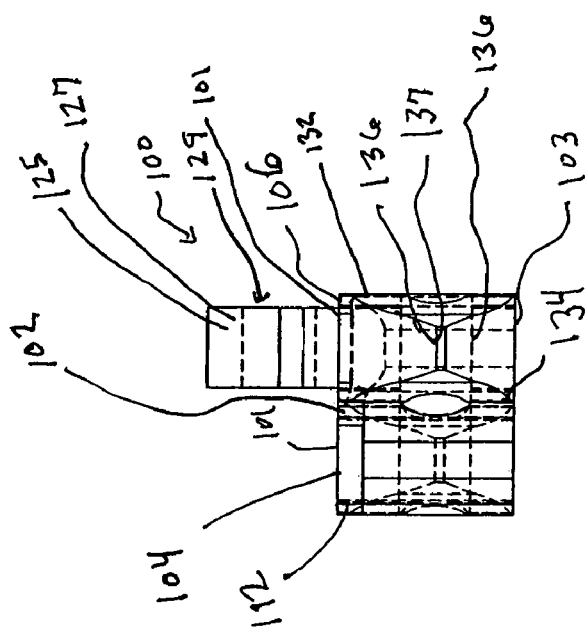
FIG. 10 is a front elevational view of the modular link-pair.

The second link 106 extends from the intermediate section 102 in a direction opposite the first link 104, as shown in FIG. 7 and 9. The second link 106 has a first portion 126 joined to the intermediate section 102, an intermediate portion 128 joined to the first portion 126, and an end portion 130 joined to the intermediate portion 128. As shown in FIG. 10, the load surface 101 extends over a portion of the second link 106, and meets with a holder surface 127 that extends over a holder 125, and the holder 125 extends from the second link 106. As shown in FIGS. 6-8 and 10, the holder 125 thus extends from the load surface 101 of the second link 106. The second link 106 also has a first surface 132 and an opposed second surface 134, each of which extends from the support surface 103 to the load surface 101 and holder surface 127. As shown in FIG. 10, the first and second surfaces 132, 134, respectively, and the load surface 101 and support surface 103 meet at a second link curved surface 136 located at an end 137 of the second link 106. As shown in FIGS. 6-8, the second link 106 also has an elongated opening 138 defined by surface 139 that is the substantially the same as the elongated opening 38 described above in connection with the first embodiment.

As shown in FIGS. 6-8, the holder 125 of the modular link-pair 100 has a holder opening 129. The holder opening 129 is sized to receive a load member 84 therein, said load member 84 having been described above in connection with the first embodiment.

Pivot rods 40 are used to attach the modular link-pair 100 to the modular belt conveyor 16, such that the modules 18 and modular link-pairs 100 become part of the modular belt conveyor 16. In particular, the openings 36 in the first link ends 22 in a row of modules 20 are aligned, and two modular link-pairs 100 are moved between adjacent modules.18 in the row of modules 20, such that the openings 36 in the first link ends 22 align with the openings 108 in the first link ends 104 of the modular link-pairs 100. Then, the second link ends 24 on an adjacent row of modules 20 are moved into the spaces defined between the first link ends 22 and first link ends 104. A pivot rod 40 is positioned in the openings 36 and 108, and in the elongated openings 38 in the second link ends 24 of the adjacent row of modules 18. Then, the first link ends 22 of an adjacent row of modules 20 are moved in the spaces between the second link ends 24 and second link ends 106. A pivot rod 40 is positioned in the elongated openings 38 and the elongated openings 138, and openings 36 in the first link ends 22 of the adjacent row of modules 20. The ends of the pivot rods are then formed to have heads, forming a head on a pivot rod is well known to those having ordinary skill in the art.

In this arrangement, the two modular link-pairs 100 are attached to the modular belt conveyor 16 to become part of the modular belt conveyor 16. Also, in this arrangement, the openings 129 in spaced apart holders 125 are aligned with one another, such that the load member 84 can be slid through the openings 129 to form the flight 145. Heads are then formed on the load member 84 so that it cannot slid out of or work its way out of the openings 129 formed in the holders 125. In one of the embodiments the load member 84 is spaced about 1.5 inches to about 1.0 inch (12 millimeters to about 25 millimeters) above the load surface 101 of the modular link-pair 100. In other embodiments this spacing can be greater of less.

The modular conveyor belt 16 is provided with flights 145 on spaced apart rows of modules 20. In addition, there can be more than two modular link-pairs 125 provided for in the row of modules 20.

The modular link-pair 100 comprises plastic so that it can be integrally formed or molded as one piece. Thus, the first and second link ends 104, 106, respectively, the intermediate section 102, and the holder 125 are integrally formed in one of the embodiments.

In another embodiment of the invention, the above-described holders 125 could be integrally formed in then first link ends 104 of the modular link-pairs 125.

In another embodiment of the invention, the modular belt conveyor 16 can have a flight that has the bracket 46 and modular link-pair 100. In such an embodiment, the load member 84 is supported at its first end 85 by the above-described bracket 46 and supported at its second end 86 by the above-described modular link-pair 100. The installation of the modular link-pair 100 and bracket 36 into a row 20 of modules 18 is the same as described above in connection with the first and second embodiments. In addition, the same row of modules 20 can have more than one bracket 36 and more than one modular link-pair 100.

Therefore, the low cost flight attachment for the modular belt conveyor 16 provides for inexpensive flights 45, 145, respectively, that can be readily installed in existing modular belt conveyors 16 to become part of the modular belt conveyor 16.

It is also to be understood that while the above-described embodiments disclose a bracket 46 having a second opening that has a circular cross-section, and the modular link-pair 100 holder opening has a circular cross section, in other embodiments these cross sections can be rectangular, curved, or polygonal and the cross section of the load member can be made to correspond to the cross section of the opening.

It will be appreciated by those skilled in the art that while the bracket described above in connection with particular embodiments and examples, the invention is not necessarily so limited and other embodiments, examples, uses, and modifications and departures from the embodiments, examples, and uses may be made without departing from the invention.

What is claimed is:

1. A bracket for use in a modular belt, the modular belt having a plurality of modules having link ends extending from opposite sides, the bracket comprising:
    a modular portion having a first bracket opening;
    a support portion having a second bracket opening;
    an offset portion joining the modular portion and support portion such that the support portion is offset from the modular portion; and
    wherein the bracket is sized to fit in a space disposed between adjacent link ends of an adjacent module.

2. The bracket of claim 1 further comprising opposed first and second sides and wherein the first bracket opening and the second bracket opening each extend through the first and second sides.

3. A bracket for use in a modular belt conveyor, the bracket comprising:
    a modular portion having a first bracket opening;
    a support portion having a second bracket opening;
    an offset portion joining the modular portion and support portion such that the support portion is offset from the modular portion; and,
    wherein the modular portion has a first planar surface that meets with a second planar surface at about a 90° angle such that when the bracket is installed in the modular belt conveyor the first planar surface abuts against the modular conveyor belt.

4. The bracket of claim 3 wherein the offset portion has first and second concave surfaces that provide for an offset.

5. The bracket of claim 1 wherein the second bracket opening is at an angle in the range of between about 50° to about 55° relative to the first bracket opening.

6. A flight for a modular conveyor belt having rows of modules the modules having a plurality of link ends extending from opposite sides, the flight comprising:
    at least two brackets installed in at least one of the rows of modules, each of the brackets installed in a space between link ends such that they are capable of fitting into a space between adjacent link ends of an adjacent module, wherein the rows of modules have a load side; and
    an elongate load member supported by the brackets above and in spaced apart relation to the load side of the rows of modules.

7. The flight of claim 6 wherein each bracket further comprises a modular portion having a first bracket opening, a support portion having a second bracket opening, and an offset portion joining the modular portion and support portion such that the support portion is offset from the modular portion.

8. The flight of claim 7 further wherein each bracket comprises opposed first and second sides and wherein the first bracket opening and the second bracket opening extend through the first and second sides.

9. The flight of claim 7 wherein the offset portion provided for in each of the brackets has first and second concave surfaces for provide for an offset.

10. The flight of claim 7 wherein the second bracket opening is at an angle in the range of between about 50° to about 55° relative to the first bracket opening.

11. The flight of claim 6 wherein the elongate load member is spaced apart from the load surface of the belt module by a distance between about 6.0 millimeters to about 25.0 millimeters.

12. A flight module for a modular conveyor belt, the flight module having a load side, the flight module comprising:
    an intermediate section having a top surface;
    a first plurality of link ends, each having opposed side walls providing the first link ends with a first transverse thickness connected to the intermediate section at a first proximal portion and extending from the intermediate section in a direction of belt travel to a first distal portion, the first plurality of link ends each having transverse pivot rod openings;
    a second plurality of link ends, each having opposed side walls providing the second link ends with a second transverse thickness connected to the intermediate section at a second proximal portion and extending in a direction opposite to the first link ends to a second distal portion;
    wherein at least one of the link ends is truncated to provide a space for a bracket; and
    a bracket disposed in the space and supported by the module, the bracket having a modular portion with a first bracket opening, the bracket having a support portion with a second bracket opening, and the bracket having an offset portion joining the modular portion and the support portion such that the support portion is offset from the modular portion, the first bracket opening being aligned with the transverse pivot rod openings when the bracket is mounted in the space.

13. The bracket of claim 12 further comprising opposed first and second sides and wherein the first bracket opening and the second bracket opening each extend through the first and second sides.

14. The bracket of claim 12 wherein the modular portion has a first planar surface that meets with a second planar surface at about a 90° angle such that when the bracket is installed in the modular belt conveyor the first planar surface abuts against the modular conveyor belt.

15. The bracket of claim 14 wherein the offset portion has first and second concave surfaces that provide for an offset.

16. The bracket of claim 12 wherein the second bracket opening is at an angle in the range of between about 50° to about 55° relative to the first bracket opening.

17. A modular link-pair for use in a modular belt having a plurality of link ends, the modular link-pair comprising:
    a first link end and a second link end joined to one another by an intermediate section and extending from the intermediate section in opposite directions;
    the first link end has a pivot rod opening and the second link end has a pivot rod opening;
    wherein the modular link pair has a holder having a holder opening for receiving a load member;
    wherein the modular link pair defines a surface capable of aligning with the top surface of the modular belt;
    wherein the load member is disposed in spaced apart relation to the surface of the modular link pair and the top surface of the modular belt such that an open space is defined between the load member and the surfaces.

18. The modular link-pair of claim 17 having a load surface and the holder extends from the load surface.

19. The modular link-pair of claim 17 wherein the modular link-pair is integrally formed.

20. The modular link-pair of claim 18 having a support surface opposite the load surface and the support surface of the first link end has a recess.

21. The modular link-pair of claim 17 wherein the first link end has a first link portion joined to the intermediate section, an intermediate portion joined to the first link portion, and an enlarged portion joined to the intermediate portion such that the pivot rod opening is formed in the enlarged portion.

22. A method of making a flight for a modular belt conveyor having rows of modules having pivot rod openings and elongated openings, the method of making the flight comprising:

providing a first modular link-pair having a first link having a pivot rod opening and a second link having an elongated opening and providing a reach bar from which the first and second link ends extend in opposite directions;

providing a second modular link-pair having a first link having a pivot rod opening and a second link having an elongated opening and providing a reach bar from which the first and second link ends extend in opposite directions;

providing each of the second link ends with a holder having a holder opening;

providing pivot rods and aligning the first and second modular link-pairs with the row of modules such that the pivot rod openings in the first and second modular link-pairs align with the pivot rod openings in the modules and such that the elongated openings in the first and second modular link-pairs align with the elongated openings in the modules; and inserting a pivot rod in the aligned pivot rod openings, and providing a load member and inserting the load member in the holder openings.

23. A method of making a bracket for a modular conveyor belt the modular conveyor belt having a plurality of link ends, the method of making the bracket comprising:

providing a modular portion having a first bracket opening;

providing a support portion having a second bracket opening; and providing an offset portion and joining the modular portion and support portion such that the support portion is offset from the modular portion; and, sizing the bracket to fit in an open space disposed between adjacent link ends.

24. A method of making a bracket for a modular conveyor belt, the method of making the bracket comprising:

providing a modular portion having a first bracket opening:

providing a support portion having a second bracket opening:

providing an offset portion and joining the modular portion and support portion such that the support portion is offset from the modular portion; and providing the bracket with opposed first and second surfaces and a surrounding surface extending between the opposed first and second surfaces, and providing the surrounding surface with a first planar surface that meets with a second planar surface at about a 90° angle such that when the bracket is installed in the modular belt conveyor the first planar surface abuts against the modular conveyor belt.

25. A method of making a flight for a modular belt conveyor having rows of modules, each module having a load side, the method of making the flight comprising:

providing a pair of brackets and installing the brackets in a spaced apart relationship in one of the rows of modules; and providing an elongate load member and supporting the load member with the brackets, the load member disposed in spaced apart relation to the load side of the modules when supported by the brackets such that an open space is formed between the load member and the load side of the modules.

26. A method of making a modular link-pair for use in a modular belt conveyor, the method of making the modular link-pair comprising:

providing a first link end and a second link end and providing an intermediate section and joining the first link end and the second link end to the intermediate section such that they extend from a reach bar in opposite directions;

providing the first link end with a pivot rod opening and providing the second link end with an elongated opening; and providing the second link end with an integral holder having a holder opening.

* * * * *